United States Patent Office 3,660,569
Patented May 2, 1972

3,660,569
PROCESS FOR SEPARATING MOENOMYCIN
Ulrich Schacht, Bad Soden, Taunus, Rudolf Tschesche, Rottgen, and Ingolf Duphorn, Villip, Germany, assignors to Farbwerke Hoechst Aktiengesellschaft vormals Meister Lucius & Bruning, Frankfurt am Main, Germany
No Drawing. Filed Nov. 30, 1965, Ser. No. 510,689
Claims priority, application Germany, Dec. 10, 1964, F 44,660
Int. Cl. A61k 21/00
U.S. Cl. 424—124                                1 Claim

ABSTRACT OF THE DISCLOSURE

Three components of Moenomycin having molecular weights of 68,000 to 70,000, practically identical infrared spectra and elementary analyses, and a method for separating said components from pure Moenomycin.

---

British patent specification No. 977,327 describes the preparation of the new antibiotic Moenomycin which is highly effective against gram-positive pathogenic germs. Pure Moenomycin is an acid, high-molecular amorphous polysaccharide, which contains 48.5% of C, 7.3% of H, 5.1% of N and 1.8% of P the remainder is O. The determination of the molecular weight by means of an ultra-centrifuge (sedimentation constant) and light diffusion method gave values of 68,000 to 70,000. Moenomycin is not dialysable and can be salted out with neutral salts (ammonium sulphate) in an aqueous solution. The potentiometric titration gives an equivalent weight of about 800 and a pK-value of 4.1. The ultraviolet-maximum of the highly purified antibiotic is 258 m$\mu$. When subjected to paper electrophoresis Moenomycin does not show any migration in buffer solutions of a pH-value of 1.9 and 7.8, while at pH-values of 9.8 it migrates to the anode. The following $R_f$-values are found in the paper chromatography:

TABLE 1

| System: | $R_f$ |
|---|---|
| n-butanol/triethyl amine/methylisobutyl-ketone/water 14:1:1:5 | 0.05 |
| Benzene/glacial acetic acid/water, 2:2:1 | 0 |
| n-butanol/glacial acetic acid/water, 4:1:5 | 0.88 |
| tert.-butanol/glacial acetic acid/water, 60:6:34 | 0.70 |
| butanol, saturated with water | 0 |
| sec. butanol/glacial acetic acid/water, 4:1:1 | 0.05 |

It has now been found that the antibiotic can be split up chromatographically into three antibiotically active components which are subsequently referred to as Moenomycin A, B and C. The Moenomycin described above shall be understood as "Moenomycin complex."

The preparative separation is carried out by means of column chromatography on silica gel while using as elution agents mixtures of low molecular alcohols and low molecular aqueous amines preferably ammonia. Appropriate alcohols are preferably n-propanol and isopropanol. In some cases it may be advisable to add buffer substances, for example, borate or phosphate buffers.

The quantitative proportion of propanol and ammonia may vary within wide limits. The elution agent usually contains 50–90%, preferably 65–85%, of propanol; the remainder being aqueous ammonia. It is preferred to use 2 N aqueous ammonia; it is, however, possible, to use concentrations of up to 14 N.

The components are isolated from the eluted fractions by cautiously evaporating the solvent and purified in the usual manner by dissolving and precipitating the products from methanol with ether or by extracting them from an aqueous, weakly acid solution with 1 N butanol.

The pure components Moenomycin A, B and C resemble each other chemically and show the same reactions as the Moenomycin complex as far as solubility, acid properties, molecular weight, paper chromatography, paper electrophoresis, colour reaction and stability are concerned. In addition, the components are characterized by the following data:

MOENOMYCIN A

Elementary analysis (free acid) (percent): C, 48.6; H, 7.2; N, 5.3; P, 1.8; O, remainder.
Melting point (free acid): 184°–185°.
Ultraviolet spectrum in phosphate buffer (pH 7.0): maximum at 258 m$\mu$, $$E_{1\,cm.}^{1\%} = 106$$

minimum at 230 m$\mu$, $$E_{1\,cm.}^{1\%} = 28$$

In 0.1 N HCl:
maximum at 247 m$\mu$, $$E_{1\,cm.}^{1\%} = 78$$

minimum at 223 m$\mu$, $$E_{1\,cm.}^{1\%} = 40$$

Infra red spectrum: The free acid has bands at 2.95; 3.41; 5.81; 6.13; 6.45; 7.28; 7.53; 8.22 and 9.40 m$\mu$, the sodium salt at 2.95; 3.40; 5.81; 6.00; 6.57; 7.15; 7.55; 8.15; 9.40 m$\mu$.
Optical activity: The sodium salt has a slight rotation of $[\alpha]_D^{23} = +4.0°$ (c.=1% in water).
Think-layer chromatography: cf. Table 2.

MOENOMYCIN B

Elementary analysis (free acid) (percent): C, 47.8; H, 7.2; N, 4.9; P, 1.8; O, remainder.
Melting point (free acid): 183°–184° C.
Ultraviolet spectrum: Moenomycin B has no ultraviolet absorption within the range of from 220–400 m$\mu$.
Infra red spectrum: the free acid has bands at 2.95; 3.40; 5.80; 5.95; 6.40; 7.25; 7.55; 8.20; 8.60 (shoulder) and 9.40 m$\mu$, the sodium salt at 2.95; 3.40; 5.80; 5.95; 6.25; (shoulder) 6.40 (shoulder); 7.15; 7.55; 8.17; 8.60; (shoulder); and 9.40 m$\mu$.
Optical activity: free acid $[\alpha]_D^{23} = +4.0°$ (c.=1% in water).
Thin-layer chromatography: cf. Table 2.

MOENOMYCIN C

Elementary analysis (free acid) (percent): C, 49.1; H, 7.4; N, 5.3; P, 1.7; O, remainder.
Melting point (free acid): 178°–179° C.
Ultraviolet spectrum: in phosphate buffer (pH 7): maximum at 258 m$\mu$, $$E_{1\,cm.}^{1\%} = 102$$

minimum at 234 m$\mu$, $$E_{1\,cm.}^{1\%} = 50$$

In 0.1 N HCl:
maximum at 245 m$\mu$, $$E_{1\,cm.}^{1\%} = 80$$

minimum at 223 m$\mu$, $$E_{1\,cm.}^{1\%} = 52$$

Infra red spectrum: Identical with that of Moenomycin A.
Optical activity: free acid $[\alpha]_D^{23} = +4.0$ (c.=1% in water).

Thin-layer chromatography: cf. Table 2.

TABLE 2

[Thin-layer chromatographical behaviour of Moenomycin A, B and C on silica gel G]

| Moenomycin | R_f-values | | |
|---|---|---|---|
| | A | B | C |
| Solvent system: | | | |
| Isopropanol/2N NH₃ 70:30 | 0.45 | 0.36 | 0.53 |
| Isopropanol/water/borate buffer, pH 9.0 70:25:5 | 0.38 | 0.55 | 0.38 |
| Ethanol/water 4:1 | 0.70 | 0.44 | 0.77 |

The three components A, B and C have the same biological activities. The following table compiles the antibacterial spectrum:

TABLE 3

Antibacterial spectrum of Moenomycin A, B and C

Test organism:
| | |
|---|---|
| Staph. aureus P209 | 0.05 |
| Staph. aureus—tetracycline resistant | 0.05 |
| streptomycin resistant | 0.05 |
| penicillin resistant | 0.05 |
| novobiocin resistant | 0.05 |
| erythromycin resistant | 0.05 |
| Streptococcus haemolyticus | 0.05 |
| Streptococcus viridans | 0.4 |
| Sarcina lutea | 16 |
| Corynebact. diphtheriae | 0.1 |
| Bacillus subtilis | 0.1 |
| Bacillus cereus | 0.45 |
| Bacillus mesentericus | 0.24 |
| Bacillus mycoides | 3.7 |
| Bacillus anthracis | 0.12 |
| Enterococcus | 0.05 |
| E. coli | 188 |
| Klebs. thinoscleromatis | 94 |
| Proteus vulgaris | 23 |
| Pseudomonas aeruginosa | 94 |
| Salm. paratyph. A | 188 |
| Salm. paratyph. B | 188 |
| Salm. pullorum | 77 |
| Shigella flexneri | 47 |
| Pasteurella septica | 35.7 |
| Brucella abortus Bang | 1.2 |
| Brucella melitensis | 4.7 |

The following example serves to illustrate the invention but it is not intended to limit it thereto:

Example 400 g. of sieved silica gel, grain size 75–150 mμ, which has been purified by treatment with semi-concentrated hydrochloric acid, subsequent neutral washing and activation at 130° C. are filled in a chromatography column. 4 g. of Moenomycin complex purified by chromatography on Florisil® are then dissolved in 10 ml. of water, the solution is given to 20 g. of purified silica gel and after drying filled onto the head of the column. The elution is now carried out by means of the following solvents:

n-Propanol/2 N NH₃:
| | |
|---|---|
| (I) | 100:20 (2.0 l) |
| (II) | 80:20 (2.0 l) |
| (III) | 80:30 (2.5 l) |

The remaining impurities and dyestuffs are eluated with the eluating agents (I) and (II), whereas system (III) starts the fractionation of Moenomycin. A fraction divider collects fractions of 15 ml. which are examined for the presence of Moenomycin components by a thin-layer chromatography analysis (system of the table, rendered visible by fluorescence extinction with an ultraviolet lamp of 260 mμ or by spraying with chlorosulfonic acid/glacial acetic acid 2:1 and subsequent heating to 105° C. for 15 minutes, red violet blots).

| Fraction No. | Moenomycin component | Yield after isolation, mg. |
|---|---|---|
| 55–95 | C | 440 |
| 96–105 | C+A [1] | 470 |
| 106–140 | A | 585 |
| 141–155 | A+B [1] | 610 |
| 156–170 | B | 275 |

[1] Mixture.

To isolate the pure components the united fractions are evaporated to dryness in vacuo, the residues are dissolved in methanol and after filtration the Moenomycin components are precipitated by addition of an excess of ether. The precipitations are removed by centrifugation, washed with ether and dried. Colorless, amorphous substances of the properties described above are obtained.

We claim:

1. A process for separating Moenomycin A, B and C from a highly purified Moenomycin complex in which the Moenomycin complex is subjected to column chromatography on silica gel while using as an elution agent a mixture of a water-miscible alcohol and ammonia wherein Moenomycin A is characterized by the following properties:

(a) elementary analysis (free acid) (percent): C =48.6, H=7.2, N=5.3, P=1.8, O=remainder.
(b) melting point (free acid): 184°–185° C.;
(c) ultraviolet spectrum in phosphate buffer solution at pH 7: maximum absorption at 258 mμ, $$E^{1\%}_{1\,cm.} = 106$$

minimum absorption at 230 mμ, $$E^{1\%}_{1\,cm.} = 28$$

in 0.1 N-HCl-solution maximum absorption at 247 mμ, $$E^{1\%}_{1\,cm.} = 78$$

minimum absorption at 223 mμ, $$E^{1\%}_{1\,cm.} = 40$$

(d) infra red spectrum; free acid: maximum absorption at 2.95, 3.41, 5.81, 6.13, 6.45, 7.28, 7.53, 8.22 and 9.40 mμ; sodium salt; maximum absorption at 2.95, 3.40, 5.81, 6.00, 6.57, 7.15, 7.55, 8.15 and 9.40 mμ;
(e) thin-layer chromatography: $R_f$-values of 0.45 (system isopropanol/ammonia 70:30) and 0.70 (system ethanol/water; and
(f) a molecular weight of 68,000 to 70,000;

Moenomycin B is characterized by the following properties:

(a) elementary analysis (free acid) (percent): C =47.8, H=7.2, N=4.9, P=1.8, O=remainder;
(b) melting point (free acid): 183°–184° C.;
(c) ultraviolet spectrum: none;
(d) infra red spectrum: free acid: 2.95, 3.40, 5.80, 5.95, 6.40, 7.25, 7.55, 8.20, 8.60 (shoulder), and 9.40 mμ; sodium salt: 2.95, 3.40, 5.80, 5.95, 6.25 (shoulder), 6.40 (shoulder); 7.15, 7.55, 8.17, 8.60 (shoulder), and 9.40 mμ;
(e) thin-layer chromatography: $R_f$-values of 0.36 (system isopropanol/2 N-ammonia 70:30) and 0.44 (system ethanol/water 4:1); and
(f) a molecular weight of 68,000 to 70,000; and Moenomycin C is characterized by the following properties:

(a) elementary analysis (free acid) (percent): C =49.1, H=7.4, N=5.3, P=1.7, O=remainder;
(b) melting point (free acid): 178°–179° C.;
(c) ultraviolet spectrum in phosphate buffer solution at pH 7: maximum absorption at 258 mμ, $E_{1cm}^{1\%} = 102$ minimum absorption at 234 m$\mu$, $E_{1cm}^{1\%} = 50$ in 0.1 N-HCl-solution; maximum absorption at 247 m$\mu$, $E_{1cm}^{1\%} = 78$ minimum absorption at 233 m$\mu$, $E_{1cm}^{1\%} = 40$ (d) infra red spectrum: identical with Moenomycin A;
(e) thin-layer chromatography: $R_f$-values of 0.53 (system isopropanol/ammonia 70:30) and 0.77 (system ethanol/water 4:1); and
(f) a molecular weight of 68,000 to 70,000 are separated out.

No references cited.

JEROME D. GOLDBERG, Primary Examiner

U.S. Cl. X.R.

424—118